United States Patent [19]

Meiller et al.

[11] 4,363,733

[45] Dec. 14, 1982

[54] PROCESS FOR WATER TREATMENT BY FLOCCULATION

[75] Inventors: Francois Meiller, Palaiseau; Yannick Le Du, Maisons-Alfort, both of France

[73] Assignee: Rhone-Poulenc Industries, Paris, France

[21] Appl. No.: 188,147

[22] Filed: Sep. 17, 1980

Related U.S. Application Data

[63] Continuation of Ser. No. 108,056, Dec. 28, 1979, abandoned.

[30] Foreign Application Priority Data

Dec. 28, 1978 [FR] France .................................. 78 36644
Dec. 14, 1979 [EP] European Pat. Off. ........ 79 401017,3

[51] Int. Cl.³ ............................................. C02F 1/54
[52] U.S. Cl. .................................... 210/727; 210/730; 435/104
[58] Field of Search ....................... 435/104, 910, 830; 210/730, 731, 723, 724, 727

[56] References Cited

U.S. PATENT DOCUMENTS

| | | | |
|---|---|---|---|
| 3,208,526 | 9/1965 | Patton et al. | 210/730 X |
| 3,342,732 | 9/1967 | Goetz | 435/104 X |
| 3,346,463 | 10/1967 | Goren | 210/730 X |
| 3,406,114 | 10/1968 | Goren | 435/910 X |

FOREIGN PATENT DOCUMENTS 54-98043 8/1979 Japan ................................... 210/730

*Primary Examiner*—Thomas G. Wyse
*Attorney, Agent, or Firm*—Burns, Doane, Swecker & Mathis

[57] ABSTRACT

A water treatment process is provided wherein water of a pH in the range of about 6 to 9 is treated with a flocculating agent, most preferably, an iron or aluminum comprising flocculating agent, and a flocculation additive comprising a heteropolysaccharide generated by the action of bacteria of the genus Xanthomonas or Arthrobacter, or fungi of the genus Sclerotium. The flocculating agent is added initially to the water, with the heteropolysaccharide comprising flocculation additive being added subsequent thereto. The process finds particular utility in the purification of potable waters.

26 Claims, No Drawings

PROCESS FOR WATER TREATMENT BY FLOCCULATION

CROSS REFERENCE TO RELATED APPLICATION

This is a continuation application of co-pending application Ser. No. 108,056, filed Dec. 28, 1979, now abandoned hereby expressly incorporated by reference in its entirety and relied upon.

BACKGROUND OF THE INVENTION

1. Field of the Invention

The present invention relates to a novel process for treating, and more particularly, purifying, water by using the technique of flocculation. More specifically, the present invention relates to a process for purifying water wherein a flocculating agent is added to the water, which addition is followed by the addition of a flocculation additive comprising a high molecular weight heteropolysaccharide.

2. Description of the Prior Art

The use of flocculating agents in the treatment of water and sludges is known, with such flocculating agents generally comprising a metallic salt such as $CaCl_2$, $FeCl_2$, $FeCl_3$, $FeSO_4$ or $Fe_2(SO_4)_3$, or, a mixture of said salts. For example, see French Pat. No. 1,399,351. Aluminum sulfate is also frequently used as a water treatment flocculating agent.

Two phenomena are generally involved in flocculation, the first being the neutralization of charges, and the second being the combination of neutralized particles into coarse floccules. Aluminum sulfate and the various iron compounds, however, generally produce but the first phenomenon, thereby generating only small floccules which decant slowly. Thus, an improvement in the flocculation action of aluminum and iron comprising agents, and hence, the resulting decantation operation, is of importance for obtaining more efficient flocculation.

Regarding the treatment of water in general, one of the great difficulties thereof resides in the fact that the nature of the water to be treated is emminently variable from location to location, and even in the same location from day to day. The problem, of course, is that a particular flocculating agent or treatment process employing same may be appropriate for treatment of certain water, but may not be appropriate for the treatment of water of a different nature.

Accordingly, it is a major object of the present invention to provide a process which is generally applicable for the treatment and purification of water, regardless of the nature of the water.

Another object of the present invention is to provide a novel and effective process of purifying water employing the technique of flocculation.

Still another object of the present invention is to provide an improved process of treating water via flocculation wherein an iron or aluminum comprising flocculating agent is employed.

Other objects, features and advantages will become apparent to those skilled in the art upon a study of this disclosure and the appended claims.

SUMMARY OF THE INVENTION

A novel process for the treatment of water has now surprisingly been found which achieves the aforenoted objectives via flocculation, which treatment or flocculation process comprises the sequential addition to the water to be treated, same having a pH in the range of about 6 to 9, of (i) a flocculating agent, preferably an iron or aluminum comprising flocculating agent, and (ii) a flocculation additive comprising a heteropolysaccharide obtained by the fermentation of a carbohydrate via the action of bacteria of the genus Xanthomonas or Arthrobacter, or a fungi of the genus Sclerotium.

In another embodiment of the instant invention, a salt soluble in the water medium is added thereto simultaneously with the flocculating agent. Said salt additive is preferably a salt of a metal selected from the group consisting of the metals of Group IIa of the periodic table, aluminum, zinc, copper and manganese.

DETAILED DESCRIPTION OF THE INVENTION

More particularly, it has been unexpectedly found that improved flocculation, and thus improved decantation and purification, can be obtained when using a flocculating agent, and in particular, an aluminum or iron comprising flocculating agent, if said flocculating agent is initially introduced into the water to be treated, with or without an appropriate soluble salt additive, and then a heteropolysaccharide comprising flocculation additive is subsequently added. Although the length of time between the initial addition of the flocculating agent and the subsequent addition of the heteropolysaccharide comprising flocculation additive can vary greatly, generally, and most preferably, it has been found that the addition of the flocculation additive may be effected after a delay, for example, of from about 1 to about 5 minutes with respect to the addition of the flocculating agent, with improved results. If a soluble salt additive is employed, same is introduced simultaneously with the flocculating agent, i.e., either conjointly or separately, therewith.

The flocculation additive employed in the process of the instant invention is a heteropolysaccharide. For the purposes of the subject invention, the term heteropolysaccharide signifies a high molecular weight, preferably greater than one million, linear, exocellular products obtained by the fermentation of a carbohydrate. Said carbohydrate can be fermented under the action of bacteria, of the genus Xanthomonas or Arthrobacter, or fungi, belonging to the genus Sclerotium.

The bacteria or fungi that may be used in the fermentation process of the carbohydrate in producing the heteropolysaccharide used in the process of the instant invention can be of any species of the three aforenoted genera, appropriate examples of which are: *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vseicatoria, Xanthomonas vitians, Xanthomonas pekargonii, Xanthomonas pelargonii, Arthrobacter stabilis, Arthrobacter viscosus, Sclerotium glucanicum, Sclerotium rolfii.*

Bacteria of the following species are particularly suitable for this type of fermentation: *Xanthomonas begoniae, Xanthomonas campestris, Xanthromonas incanae* and *Xanthomonas pisi.*

Bacteria of the species *Xanthomonas campestris* are particularly well suited and most preferred for the purpose of the present invention.

The carbohydrate which may be fermented with the microorganisms belonging to the aforenoted genera in order to produce the heteropolysaccharide used in the process of flocculation of the present invention can be virtually any carbohydrate appropriate for fermentation. Examples of appropriate carbohydrates include glucose, saccharose, fructose, maltose, lactose, soluble starch, corn starch, and potato starch. Other carbohydrates may also be suitably fermented, as can be selected by one skilled in the art.

The fermentation of the carbohydrate generally takes place in an aqueous medium containing up to about 60 g/l glucide. The fermenting medium may additionally comprise, however, a source of phosphorus, a source of magnesium, which is an enzyme activator, and a source of nitrogen, which usually consists of "distillery solubles" (U.S. Pat. No. 3,000,790); the bran or meal of whole grain, such as sorghum, soy beans or corn (U.S. Pat. No. 3,271,267); "corn steep" (U.S. Pat. No. 3,335,447); or, mineral nitrogen compounds such as ammonium nitrate (U.S. Pat. No. 3,391,060); or ammonium phosphate (FR Application 76/05933 and corresponding U.S. Pat. No. 4,154,654).

The raw brewing worts or isolated heteropolysaccharide may be employed as the fermentation produced heteropolysaccharide. When the former is used, i.e., the raw brewing wort, it may be advantageous, prior to its use, to subject the fermented wort to heat of a temperature in the range of about 80° to about 130° C. for a period of time of approximately 10 minutes to approximately 1 hour. When the heteropolysaccharide is isolated from the fermented wort, same can be used in the form of a powder. The polysaccharide can be separated or isolated from the wort, which may also be preheated as indicated hereinabove, by conventional methods. For example, the heteropolysaccharide can be isolated by precipitation upon the addition to the wort of a lower alcohol, such as methanol, ethanol, isopropanol, and tertiary butanol, or acetone or a mixture of such precipitating agents. Once precipitated, the polysaccharide is separated, washed with the liquid of precipitation, then dried, and if to be used in powder form, ground.

The heteropolysaccharide, either as the fermented wort or in isolated form, can be purified via known methods, which consist of, for example, exposing the fermented wort or the aqueous, reconstituted gel of the polysaccharide extracted from the wort to operations of centrifugation or filtration with diatomaceous earths, as well as exposure to the action of protease type enzymes (See U.S. Pat. No. 3,966,618 and 4,010,071) or of sodium hydroxide (See U.S. Pat. No. 3,729,460).

For the application envisioned in the present invention, the heteropolysaccharide may be used by itself as the flocculation additive, or it may be mixed with other gums or derivatives thereof, such as carob gum, agar-agar gum, guaranates, and alginates.

The flocculating agent employed in the process of the instant invention may consist of a conventional flocculant, but is preferably a conventional flocculant based on or comprising iron and/or aluminum, e.g., such as the sulfate, chloride, and hydroxychloride, of aluminum; ferric chloride or ferric chlorosulfate.

It is also within the scope of the invention to employ an additive consisting of a salt soluble in the medium. Preferably, same comprises a salt of a metal selected from the group consisting of a Group IIa metal of the periodic table, aluminum, zinc, copper and manganese. [See French Application 78/23215, filed Aug. 7, 1978 in the name of the present applicant.] If employed, it is preferred that the salt additive consist of a magnesium or aluminum salt, and more specifically, either the chloride, nitrate or acetate salt of these two metals.

In the addition of the flocculating agent to the water to be treated, it is preferred that said addition be such as to allow rapid contacting of the two. For this reason, it is preferable to maintain the water to be treated under strong agitation, which can be effected by devices conventionally used in the field under consideration for such purposes. (See, for example, PERRY & CHILTON, 5th edition, 1973).

Once the flocculating agent has been added, the addition of the flocculation additive then follows, also under strong agitation, but over a brief period of time. Generally, about 1 to 2 minutes have been found to be sufficient.

After the sequential addition of the flocculating agent and heteropolysaccharide comprising flocculation additive has been effected, the resulting medium is maintained under slow agitation for a period of time sufficient to allow flocculation to occur, e.g., 15 to 30 minutes, after which agitation is discontinued to permit decantation.

The flocculating agents and the flocculation additives may be employed and added in the form of powder, but it is preferable to use and add them in the form of a solution. Respecting the amount of flocculating agent to be used, the amounts can vary greatly based on the agent and water to be treated. However, the following solutions have been found to be of general suitability: For aluminum comprising flocculating agents; generally, a solution containing 630 g/liter of hydrated aluminum sulfate, corresponding to 8% aluminum oxide, $Al_2O_3$, in a proportion of approximately 5 to 150 cm$^3$ of said solution per m$^3$ of water treated, is appropriate; a solution containing 700 g/liter of aluminum chloride, corresponding to 15% aluminum oxide, $Al_2O_3$, in a proportion of approximately 10 to 100 cm$^3$ of said solution per m$^3$ of water treated, is appropriate; and a solution of aluminum hydroxychloride at 10% aluminum oxide in a proportion of approximately 10 to 100 cm$^3$ of said solution per m$^3$ of water treated, is appropriate.

For iron based flocculating agents; solutions containing 600 g/liter of ferric chloride or 685 g/liter of ferric chlorosulfate, corresponding to 200 g/l of iron, are appropriately used in a proportion of approximatedly 15 to 60 cm$^3$ of said solutions per m$^3$ of water treated.

It should be noted that the aforegiven values are merely exemplative and are not meant as being limitative as same can easily be adapted by those skilled in the art as a function of numerous parameters, more specifically, the nature of the water and its temperature, the flocculating agent and its concentration in the solution.

Concerning the heteropolysaccharide comprising flocculation additive, it is used, in general, in solutions of a concentration of about 1 to 5 g/l, so that the amount of heteropolysaccharide employed ranges from about 0.3 to about 1 g of heteropolysaccharide per m$^3$ of water to be treated. As with the flocculating agent, the amount of heteropolysaccharide flocculation additive, and in particular, the amount of heteropolysaccharide, can vary within or outside of the exemplary ranges given depending upon the conditions.

As stated hereinabove, the process of the instant invention is suitable for the treatment of water, and in particular, for the treatment of potable waters which require a high degree of purity due to the increased effectiveness of the process.

In order to further illustrate the present invention and the advantages thereof, the following specific examples are given, it being understood that same are intended only as illustrative and in nowise limitative.

EXAMPLES

In the following examples,
(i) the characteristics of the water to be treated,
(ii) the preparation of the flocculating additive used, and
(iii) the conditions employed in the experiments, as described below, remain identical throughout unless otherwise noted.

(i) A series of experiments are performed with a raw water having the following characteristics:
temperature —19° C.
pH—7.7
MO —1.5 (organic matter expressed in the quantity of oxygen required to oxidize it in mg/l of oxygen, in keeping with the standard NF 90,018 of January 1960)
TAC—18.5 (complete alkalimetric titration according to J. Rodier, "The Analysis of Water," Dunod, page 106),
TH—21 (hydrometric titration) NF 90,003
Turbidity=FTU 5.5 (expressed in Formazine units according to the above cited work by J. Rodier, page 65).

(ii) The flocculation additive consists of either a raw fermented wort comprising a heteropolysaccharide, or an isolated heteropolysaccharide, the isolation or preparation of which is nowise meant to be limitative.

(a) Fermented wort

Using a portion of a culture of *Xanthomonas Campestric* maintained on agar in a tube, 100 cm$^3$ of a broth of soy bean solubles were inoculated in a flask of 1 liter capacity by means of a platinum spoon. The culture medium comprised 20 g/l saccharose and 90 cm$^3$/l of soy bean solubles.

After 72 hours of incubation at 28° C., approximately 0.15% by weight of the culture were used to inoculate 15 liters of a sterile medium contained in a 20 liter fermentor, said medium having the following composition per liter:
saccharose—20 g
soy bean meal—4 g
Na$_2$HPO$_4$.12H$_2$O—11.4 g
MgSO$_4$.7H$_2$O—0.25 g
antifoaming agent—2 cm$^3$
distilled water—to make 1 liter The mixture had a pH between 6.9 and 7.5.

After 24 hours of incubation at 28° C., with agitation and aeration, 1.5% by weight of the contents of the fermentor were transferred in a sterile manner to a pilot fermentor with a capacity of 1,400 liters, same being filled with a charge of 1,000 liters of a sterile medium having the following composition per liter:
saccharose—20 g
soy bean meal—4 g
Na$_2$HPO$_4$.12H$_2$O—11.4 g
MgSO$_4$.7H$_2$O—0.25 g
antifoaming agent—0.5 cm$^3$
distilled water—to make 1 liter The dispotassium phosphate controls and maintains the pH between 6.9 and 7.5. After 60 hours of fermentation at 28°–30° C. with agitation and aeration, no more saccharose was found in the medium. The viscosity was 6900 centipoise and the heteropolysaccharide content was 15.6 g/kg of dry matter.

The wort was then heat treated at 120° C. for 30 minutes.

(b) Heterpolysaccharide (Isolated)

The cooled wort was treated with isopropanol in a conventional manner to precipitate the heteropolysaccharide, which is then washed, dried and ground.

(iii)—The heteropolysaccharide flocculating additive was used together with the flocculating agent in a series of experiments effected in accordance with the JAR test, i.e., the method described in the work "The Decantation of Degremont" Technical Memo on Water, 1972 (Degremont, page 932). Comparative experiments were conducted in an identical manner.

The general procedure was as follows:

The flocculating agents were added to the water to be treated, as defined hereinabove, with rapid agitation (120 rpm), which is maintained for 1 minute. The agitation was continued for another minute as the flocculation additives were added. Agitation was then reduced to 40 rpm for 20 minutes.

The agitators were removed and the decantation followed for 20 minutes.

During flocculation, floccule sizes were noted in keeping with the following classification (Degremont reference):
0—no floccules
2—floccules hardly visible
4—small dots
6—moderate size floccules
8—good floccules
10—very good floccules During the decantation, the velocity of decanting was noted, with the pH, the TAC, the turbidity and the organic matter in the supernatant being determined.

A first series of experiments was performed to demonstrate the effect of the order of introduction of the reagents.

EXAMPLES 1 TO 3

Example 1 was a control example illustrating the use of an aluminum sulfate without a heteropolysaccharide flocculation additive.

Example 2 was conducted in accordance with the process of the invention, which comprises adding the heteropolysaccharide after the introduction of aluminum sulfate under the aforedescribed conditions.

Example 3 was a comparative example wherein the heteropolysaccharide was added simultaneously with the aluminum sulfate under rapid agitation (120 rpm) for 1 minute, followed by slow agitation (40 rpm) for 20 minutes.

In examples 1-3, a solution of hydrated aluminum sulfate was used at a concentration of 100 g/l, and a solution of heteropolysaccharide at a concentration of 1 g/l was used. The results are compiled in Table I.

TABLE I

| Ex. | Flocculating Agent Nature | Dose g/m³ | Flocculation Additive Nature | Dose g/m³ | Floccule Size 5 mn | 10 mn | 15 mn | Decantation |
|---|---|---|---|---|---|---|---|---|
| 1 | Aluminum Sulfate | 35 | — | | 4 | 6 | 6 | Slow |
| 2 | Aluminum Sulfate | 35 | Heteropolysaccharide | 0.5 | 6 | 8 | 8 | Good |
| 3 | Aluminum Sulfate | 35 | Heteropolysaccharide | 0.5 | 4 | 6 | 6 | Slow |

As can be seen from Table I, the addition of polysaccharide subsequent to the aluminum sulfate in accordance with the invention improves flocculation and decantation.

In contrast, when the heteropolysaccharide is introduced simultaneously with the aluminum sulfate, no improvement is found with respect to the exclusive use of aluminum sulfate.

Another series of experiments was performed using different flocculating agents by themselves, or together with a heteropolysaccharide comprising flocculating additive.

EXAMPLES 4 TO 13

Examples 4, 6, 8, 10 and 12 were control examples conducted in the absense of a flocculation additive. The flocculation agent employed was either aluminum sulfate, aluminum hydroxychloride of the formula Al₂(OH)₂.₅Cl₃(SO₄)₀.₂₅, ferric chloride, ferric chlorosulfate, or aluminum chloride.

In Examples 5, 7, 9, 11, and 13, a heteropolysaccharide comprising flocculation additive was added in accordance with the process of the invention.

As the flocculating agents, a hydrated aluminum sulfate solution was used having a concentration of 630 g/l (8% aluminum oxide, Al₂O₃), a ferric chloride solution of a concentration of 600 g/l (200 g/l iron), a ferric chlorosulfate solution of a concentration of 685 g/l (200 g/l iron), an aluminum chloride solution of a concentration of 700 g/l (15% aluminum oxide, Al₂O₃), and an aluminum hydroxychloride solution having a concentration corresponding to 10% aluminum chloride, Al₂O₃. The solution of heteropolysaccharide employed had a concentration of about 1 g/l.

The results obtained are compiled in Table II.

TABLE II

| Ex. | Flocculating Agent Nature | Dose cm³/m³ | Flocculation Additive Nature | Dose g/m³ | pH of water | Floccule Turbidity | TAC | MO mg/l | Size 5 mn | 10 mn | Decantation |
|---|---|---|---|---|---|---|---|---|---|---|---|
| 4 | Aluminum Sulfate | 50 | — | | 7.5 | 1.1 | 17.2 | 1.15 | >4 | >4 | Slow |
| 5 | Aluminum Sulfate | 50 | Heteropolysaccharide | 0.5 | 7.6 | 0.7 | 16.8 | 1.06 | 6 | >6 | Good |
| 6 | Aluminum Hydroxy chloride | 25 | — | | 7.7 | 0.55 | 18.1 | 1.05 | 6 | ≧6 | Good |
| 7 | Aluminum Hydroxy chloride | 25 | Heteropolysaccharide | 0.5 | 7.8 | 0.56 | 17.9 | 1.02 | 6 | <8 | Good |
| 8 | Ferric Chloride | 25 | — | | 7.5 | 0.85 | 16.2 | 0.90 | >6 | >6 | Good |
| 9 | Ferric Chloride | 25 | Heteropolysaccharide | 0.5 | 7.5 | 0.93 | 16.3 | 0.90 | <8 | 8 | Good |
| 10 | Ferric Chlorosulfate | 25 | — | | 7.5 | 0.95 | 17 | 1 | 6 | 6 | Good |
| 11 | Ferric Chlorosulfate | 25 | Heteropolysaccharide | 0.5 | 7.5 | 0.95 | 16.7 | 1 | >6 | 8 | Good |
| 12 | Aluminum Chloride | 50 | — | | 7.3 | 0.80 | 15.4 | 1.1 | >4 | >4 | Slow |
| 13 | Aluminum Chloride | 50 | Heteropolysaccharide | 0.5 | 7.3 | 0.65 | 14.8 | 1 | 6 | >6 | Good |

It is noted that in general there is an improvement in the size of the floccules and the action of decantation when a flocculating additive in accordance with the process of the invention is employed.

EXAMPLE 14

A series of experiments was performed concerning water flocculation in the presence of only heteropolysaccharide.

Heteropolysaccharide alone was used in a concentration of 1, 2, and 5 g/m³ of raw water. No flocculation took place, the water remained turbid.

In the following examples, materials other than heteropolysaccharide are used as flocculation additives in association with various flocculating agents.

EXAMPLES 15 TO 25

Results obtained with a heteropolysaccharide in accord with the invention are compared with those obtained using an alginate and different gums or derivatives thereof (e.g., carob, agar-agar, guaranate) with two different flocculating agents, ferrric chlorosulfate and aluminum sulfate.

The water treated had the following characteristics:

temperature—18° C.
pH—7.84
turbidity:FTU—5.5
The results obtained are compiled in Table III.

TABLE III

| Ex. | Flocculating Agent Nature | Dose cm³/m³ | Flocculation Additive Nature | Dose g/m³ | pH | Turbidity | Floccule Size 10 mn | Decantation |
|---|---|---|---|---|---|---|---|---|
| 15 | Ferric Chlorosulfate | 25 | Alginate | 0.5 | 7.48 | 1.4 | >6 | Good |
| 16 | Ferric Chlorosulfate | 25 | Carob Extract | 0.5 | 7.48 | 1.8 | 6 | Moderate |
| 17 | Ferric Chlorosulfate | 25 | Agar-Agar Gum | 0.5 | 7.50 | 1.8 | <6 | Slow |
| 18 | Ferric Chlorosulfate | 25 | Guaranate | 0.5 | 7.49 | 1.8 | 6 | Moderate |
| 19 | Ferric Chlorosulfate | 25 | Heteropolysaccharide | 0.5 | 7.50 | 1.1 | 8 | Good |
| 20 | Ferric Chlorosulfate | 25 | — | | 7.58 | 1.5 | <6 | Slow |
| 21 | Aluminum Sulfate | 35 | Alginate | 1 | 7.4 | 2.2 | 6 | Moderate |
| 22 | Aluminum Sulfate | 35 | Carob Extract | 1 | 7.35 | 2.2 | 6 | Moderate |
| 23 | Aluminum Sulfate | 35 | Agar-Agar Gum | 1 | 7.4 | 2.25 | 6 | Moderate |
| 24 | Aluminum Sulfate | 35 | Guaranate | 1 | 7.5 | 2.3 | 6 | Moderate |
| 25 | Aluminum Sulfate | 35 | Heteropolysaccharide | 0.5 | 7.35 | 1.6 | <8 | Good |

As can be seen from Table III, a clear improvement in flocculation and decantation is obtained upon the use of the flocculation additive in accordance with the process of the invention.

The following examples illustrate the use of a fermented wort as a flocculation additive.

EXAMPLES 26 TO 29

A fermentation wort containing 15 g/l heteropolysaccharide was used.

The water treated had the following characteristics:
temperature—18° C.
pH—7.82
turbidity:FTU—9.3

Results obtained are compiled in Table IV. The additive in Table IV is expressed in g/m³ of heteropolysaccharide.

TABLE IV

| Ex. | Flocculating Agent Nature | Dose g/m³ | Flocculation Additive Nature | Dose g/m³ | pH | Turbidity | Floccule Size 5 mn | Floccule Size 10 mn | Decantation |
|---|---|---|---|---|---|---|---|---|---|
| 26 | Aluminum Sulfate | 30 | — | | 7.3 | 2 | >4 | >4 | Slow |
| 27 | Aluminum Sulfate | 30 | Heteropolysaccharide | 0.46 | 7.3 | 1.4 | 6 | >6 | Good |
| 28 | Aluminum Sulfate | 30 | Heteropolysaccharide | 0.61 | 7.3 | 1.5 | 6 | >6 | Good |
| 29 | Aluminum Sulfate | 30 | Heteropolysaccharide | 0.77 | 7.3 | 1.2 | 6 | <8 | Good |

The following examples were intended to demonstrate the operability of a mixture of flocculating agents.

EXAMPLES 30 AND 31

The mixture of flocculating agents comprised 75 cm³ ferric chlorosulfate and 25 cm³ of a solution of aluminum sulfate.

The water treated was that of Examples 15 to 25.

In Example 30, 0.5 g/m³ of alginate, and in Example 31, 0.5 g/m³ of heteropolysaccharide in accord with the process of invention were added.

In both cases, the pH of the solution was 7.48, and the turbidity 1.8. Decantation was considered good in both cases while flocculation was clearly improved by the substitution of a heteropolysaccharide for the alginate, particularly since the pH of the water was closer to 8 than 6.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed:
1. A process for the treatment of water comprising sequentially adding to water having a pH in the range of about 6 to about 9 first (i) an iron-containing or aluminum-containing flocculating agent, and then (ii) a flocculation additive comprising a heteropolysaccharide obtained by the fermentation of a carbohydrate via the action of bacteria of the genus Xanthomonas or Arthrobacter, or fungi of the genus Sclerotium.

2. The process as defined in claim 1 wherein the heteropolysaccharide is obtained by the fermentation of a carbohydrate under the action of bacteria of the genus Xanthomonas.

3. The process as defined in claim 1 wherein the species of bacterium or fungus employed in the fermentation of the carbohydrate to provide the heteropolysaccharide of the flocculation additive is selected from the group consisting of *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vseicatoria, Xanthomonas vitians, Xanthomonas pekargonii, Xanthomonas pelargonii.*

4. The process as defined by claim 3 wherein the species is selected from the group consisting of *Xanthomonas begoniae, Xanthomonas campestris, Xanthomonas incanae* and *Xanthomonas pisi.*

5. The process as defined by claim 3 wherein the species is *Xanthomonas campestris.*

6. The process of claim 1 further comprising the simultaneous addition with the flocculating agent of a salt soluble in the medium.

7. The process of claim 6 wherein said soluble salt is a salt of a metal selected from the group consisting of a Group IIa metal, aluminum, zinc, copper and manganese.

8. The process as defined in claim 6 wherein the salt is the chloride, nitrate or acetate salt of magnesium or aluminum.

9. The process as defined by claim 1 wherein the carbohydrate fermented is selected from the group consisting of glucose, saccharose, fructose, maltose, lactose, soluble starch, corn starch, and potato starch.

10. The process of claim 1 wherein the flocculation additive comprises a heteropolysaccharide comprising raw fermented wort.

11. The process of claim 1 wherein the flocculation additive comprises an isolated heteropolysaccharide.

12. The process of claim 1 wherein the flocculation additive is added from about 1 to about 5 minutes subsequent to the flocculating agent.

13. The process of claim 1 wherein the flocculation additive is added over a period of time ranging from about 1 to about 2 minutes.

14. The process of claim 1 wherein the amount of flocculation additive employed is of such amount that effectively from 0.3 to 1 g of heteropolysaccharide is added for every $m^3$ of water to be treated.

15. The process as defined in claim 1 wherein the species of bacterium or fungus employed in the fermentation of the carbohydrate to provide the heteropolysaccharide of the flocculation additive is *arthrobacter stabilis* or *Arthrobacter viscosus.*

16. The process as defined in claim 1 wherein the species of bacterium or fungus employed in the fermentation of the carbohydrate to provide the heteropolysaccharide of the flocculation additive is *Sclerotium glucanicum* or *Sclerotium rolfii.*

17. The process as defined in claim 1 wherein the flocculating agent comprises an aluminum-containing flocculating agent.

18. The process as defined in claim 17 wherein the aluminum-containing flocculating agent comprises aluminum sulfate.

19. The process as defined in claim 17 wherein the aluminum-containing flocculating agent comprises aluminum hydroxychloride.

20. The process as defined in claim 17 wherein the aluminum-containing flocculating agent comprises aluminum chloride.

21. The process as defined in claim 1 wherein the flocculating agent comprises an iron-containing flocculating agent.

22. The process as defined in claim 21 wherein the iron-containing flocculating agent comprises ferric chloride.

23. The process as defined in claim 21 wherein the iron-containing flocculating agent comprises ferric chlorosulfate.

24. The process as defined in claim 1 wherein the flocculating agent is a mixture comprising iron-containing and aluminum-containing flocculating agents.

25. The process as defined in claim 24 wherein the flocculating agent is a mixture comprising ferric chlorosulfate and aluminum sulfate.

26. The process as defined in claim 1 wherein the flocculating agent comprises aluminum sulfate, and the species of bacterium or fungus employed in the fermentation of the carbohydrate to provide the heteropolysaccharide of the flocculation additive is *Xanthomonas campestris.*

* * * * *